United States Patent
Seroff et al.

(10) Patent No.: US 12,071,031 B2
(45) Date of Patent: Aug. 27, 2024

(54) HIGH-AVAILABILITY LOW-IMPACT VEHICLE CHARGER

(71) Applicant: FREEWIRE TECHNOLOGIES, INC., Newark, CA (US)

(72) Inventors: Nicholas Seroff, San Jose, CA (US); Tabish Shibly, Oakland, CA (US); Richard Steele, Newark, CA (US); Ravi Lavu, Fremont, CA (US)

(73) Assignee: SPEED CHARGE, LLC, Carter Lake, IA (US)

( * ) Notice: Subject to any disclaimer, the term of this patent is extended or adjusted under 35 U.S.C. 154(b) by 0 days.

(21) Appl. No.: 17/816,205

(22) Filed: Jul. 29, 2022

(65) Prior Publication Data
US 2023/0033955 A1     Feb. 2, 2023

Related U.S. Application Data (60) Provisional application No. 63/227,918, filed on Jul. 30, 2021.

(51) Int. Cl.
| | | |
|---|---|---|
| *B60L 53/10* | (2019.01) | |
| *B60L 53/16* | (2019.01) | |
| *B60L 53/62* | (2019.01) | |
| *H02J 7/04* | (2006.01) | |
| *H02J 7/00* | (2006.01) | |

(52) U.S. Cl.
CPC .............. *B60L 53/11* (2019.02); *B60L 53/16* (2019.02); *B60L 53/62* (2019.02); *H02J 7/04* (2013.01); *B60L 2210/40* (2013.01); *H02J 7/0013* (2013.01)

(58) Field of Classification Search
CPC .......... B60L 53/11; B60L 53/62; B60L 53/16; B60L 2210/40; H02J 7/04; H02J 7/0013
USPC ......................................................... 320/109
See application file for complete search history.

(56) References Cited

U.S. PATENT DOCUMENTS

| | | | |
|---|---|---|---|
| 8,054,039 B2 * | 11/2011 | Bauerle | B60L 50/64 320/109 |
| 11,131,717 B1 * | 9/2021 | Fasching | H02J 7/0048 |

(Continued)

OTHER PUBLICATIONS

International Search Report and Written Opinion for Application No. PCT/US2022/038802, dated Jan. 19, 2023.

(Continued)

*Primary Examiner* — Nathaniel R Pelton
(74) *Attorney, Agent, or Firm* — MARSHALL, GERSTEIN & BORUN LLP (57) ABSTRACT

A vehicle charging apparatus is described herein, which may include a battery pack comprising a plurality of individual batteries, a power input port receiving electrical power at a first wattage, an AC-to-DC conversion circuit configured to provide DC power to charge groups of batteries in the plurality of individual batteries, a power conversion circuit configured to condition a DC output of at least one group of batteries to provide a charging current output to a vehicle via a coupling, and a processing circuit configured to control the power conversion circuit to provide the charging current at a second wattage greater than the first wattage. The first wattage may be actively or inherently limited to a level less than the second wattage in order to provide fast DC charging with a limited power input.

24 Claims, 5 Drawing Sheets

(56) References Cited

U.S. PATENT DOCUMENTS

| | | | |
|---|---|---|---|
| 2012/0074901 A1* | 3/2012 | Mohammed | B60L 58/15 320/109 |
| 2012/0169281 A1* | 7/2012 | Itagaki | H02J 7/0013 320/109 |
| 2013/0113413 A1* | 5/2013 | Harty | B60L 53/305 320/109 |
| 2015/0054466 A1* | 2/2015 | Kinomura | B60L 53/31 320/134 |
| 2016/0009191 A1* | 1/2016 | Becker | B60L 3/04 320/152 |
| 2020/0321797 A1 | 10/2020 | Gerrits | |
| 2021/0170897 A1 | 6/2021 | Ellis | |

OTHER PUBLICATIONS

International Preliminary Report on Patentability for PCT/US2022/038802 dated Feb. 8, 2024.

* cited by examiner

HIGH-AVAILABILITY LOW-IMPACT VEHICLE CHARGER

CROSS-REFERENCE TO RELATED APPLICATIONS

This application claims the benefit of U.S. Provisional Application No. 63/227,918 (filed Jul. 30, 2021), the entirety of which is incorporated by reference herein.

TECHNICAL FIELD

At least one aspect generally relates to high-energy charging devices and more particularly to vehicle charging devices that can be deployed without improvements to infrastructure.

BACKGROUND

Universal adoption, acceptance and use of electric vehicles (EVs) and plug-in hybrid vehicles that can operate without the use or with limited use of hydrocarbon-based fuels is limited in part by the availability and capabilities of charging stations. Installation of conventional charging stations typically requires improvements to infrastructure including upgrades to electrical service and construction of suitable housing. The costs, planning and time required to install these charging systems can be a deterrent to potential commercial or residential operators. With increasing demand for EV charging stations, there is a need for improvements in charging system technologies and designs.

SUMMARY

Embodiments disclosed herein provide systems, methods and apparatuses that enable an EV charging station to be connected to an electrical power grid through a residential or low voltage and/or low current service panel while providing high-power fast charging capabilities for one or more electrical vehicles. As described further herein, a charging apparatus for charging a vehicle may be provided, such charging apparatus comprising: a battery pack comprising a plurality of individual batteries; a power input port configured to receive input electrical power from a power source, wherein the input electrical power is received at a first wattage; a power input circuit configured to provide direct current (DC) power to charge groups of batteries in the plurality of individual batteries using power received at the power input port; a power conversion circuit configured to provide a charging current as a DC output of at least one group of batteries; a coupling configured to receive the charging current and provide an electrical interconnect between the charging apparatus and the vehicle to provide the charging current to the vehicle; and/or a processing circuit configured to control the power conversion circuit to provide the charging current at a second wattage greater than the first wattage. In certain embodiments, the first wattage may be no more than 30 kilowatts, while the second wattage may be at least 120 kilowatts.

In some embodiments, the input electrical power may comprise alternating current (AC) input power from an AC power source, and the power input circuit may comprise an AC-to-DC conversion circuit configured to provide the DC power to charge the groups of batteries by converting the AC input power to the DC power. In some embodiments, the processing circuit may be further configured to limit an input power level of the AC input power to the first wattage. In further such embodiments, the processing circuit may be configured to selectively limit the input power level of the AC input power to a first value of the first wattage at a first time and to a second value of the first wattage at a second time, which may be based upon total demand levels for the AC power source at each of the first and second times. In further such embodiments, the processing circuit may be configured to control the power input circuit to disconnect the battery pack from the input electrical power at the second time (e.g., during a peak demand period), in which case the second value of the first wattage will be zero kilowatts.

In further embodiments, the input electrical power may comprise DC input power from a DC power source. In some such embodiments, the charging apparatus may further comprise an inverter circuit configured to convert the DC input power to AC power, and the power input circuit may comprise an AC-to-DC conversion circuit configured to provide the DC power to charge the groups of batteries by converting the AC power to the DC power. Additionally or alternatively, the charging apparatus may comprise a power conditioning circuit configured to receive the DC input power from the power input port and to provide a conditioned DC input current to the power input circuit in order to charge the groups of batteries in the plurality of individual batteries.

In order to control the charging current, the processing circuit may be configured to configure the at least one group of batteries to provide a desired current level for the charging current. Additionally or alternatively, the processing circuit may be configured to control the power conversion circuit to provide the charging current at a desired voltage level. In some embodiments, the power conversion circuit may be configured to condition the DC output of the at least one group of batteries to provide the charging current. In further embodiments, the charging apparatus may additionally include a temperature control element configured to maintain an internal temperature of the charging apparatus below a maximum thermal operating limit defined for the battery pack.

Systems or methods for implementing all or part of the charging apparatus described above may also be provided in some aspects in order to provide or operate an EV charging station. Additional or alternative features described herein below may be included in some aspects.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of electric vehicle (EV) or plug-in hybrid vehicle charging systems will now be presented with reference to various apparatuses and methods. These apparatuses and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include read-only memory (ROM) or random-access memory (RAM), electrically erasable programmable ROM (EEPROM), including ROM implemented using a compact disc (CD) or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, digital versatile disc (DVD), and floppy disk where disks usually reproduce data magnetically, while discs reproduce data optically with lasers. Combinations of the above should also be included within the scope of computer-readable media.

EV charging stations used for recharging batteries in EVs or plug-in hybrid vehicles can produce peak demands that exceed the capabilities of an electricity supply coupled to the EV charging stations. An electricity supply may be provided by a utility company in a community or site or by premise-provided electric generators including solar power systems and wind, water or hydrocarbon-powered generators. While advancements in EV charging now enable EVs or plug-in hybrid vehicles to charge much faster than previously possible, the electric supply requirements for such fast charging have significantly increased. For example, Level 1 vehicle charging at a rate of approximately 1-2 kilowatts (kW) can use a standard 120V residential electric power supply to fully charge a vehicle batter over the course of multiple days, while direct current fast charging (DCFC) can provide a full charge in twenty minutes to an hour at a rate of approximately 50-350 kW (with the potential for higher power in the future). However, existing DCFC equipment requires an electric power supply substantially greater than that available at residential and most commercial sites, necessitating the additional installation of a 480V three-phase transformer or similar equipment at the charging site in order to provide a high-wattage power supply to the DCFC charging station. Not only does this increase the cost and complexity of DCFC charging stations, but it also limits the locations at which such charging stations can be installed due to local electric power grid capacity constraints and physical space constraints of charging station sites. Even when conventional DCFC systems are generally feasible due to sufficient space, demand, and grid capacity, such charging systems can place excessive strain on the local power grid during periods of high use, thereby contributing to grid destabilization and even grid failure (e.g., blackouts) because the high power consumption from fast charging must be instantaneously supplied during charging.

An impediment to the widespread deployment of EV charging stations is a widespread lack of utility-provided electric service with sufficient basic capacity to support EV charging stations, necessitating costly service upgrades to support EV charging. In one example, upgraded residential electric service or upgraded solar power systems may be needed to support charging of one or more vehicles at a residence. In one example, commercial entities or public venues may require upgraded electric supply at each location in which an EV charging station is provided and such upgrades necessitate extensive construction to provide power to charging stations located in parking facilities in the commercial premises or public venues. Without upgraded electricity supplies, fast EV charging (e.g., DCFC) may be generally impractical and EV charging may be limited to low-performance EV charging stations (e.g., Level 1 or Level 2 charging stations with power output significantly below 50 kW). Limitations on available service may limit the availability of concurrent EV charging to a small fraction of the EVs requiring or desiring charging at conventional charging stations. For the purposes of this disclosure, fast charging may be defined as a charging operation that provides power at rates greater than 50 kW.

Installation of fast charging capabilities may require significant expenditures of time and money to upgrade utility service or other electrical supply when sufficient service is available. The installation process may incur regulatory delays due to long permitting processes and approval processes to obtain authorization for the upgrades to utility services and construction projects required to install solar power equipment or to upgrade utility service.

In addition to the costs of provisioning electrical service, conventional EV charging systems that support fast direct current (DC) charging typically require installation of additional equipment to connect the EV charging systems to the electrical supply. For example, ancillary equipment is needed to connect a conventional DCFC system directly to the electrical grid in order that the input power to the charger matches or exceeds the power delivered in a fast-charging mode. The ancillary equipment may include physically large or bulky components coupled to the charging head unit including transformers, large form-factor switches, and so on. The cost, time and burden of upgrading the electrical service, construction costs, and the burdens and delays in connection with installing the charging equipment often deter property owners or operators from installing EV charging systems.

Certain aspects of this disclosure provide an EV charging systems that can provide fast charging capabilities of 120 kW or more while drawing less than 30 kW from an electrical power supply. The ability to limit input power requirements while delivering significantly higher power output obviates the need for ancillary equipment that would otherwise require installation of multiple large components. For example, the ability to use existing power services can eliminate the need to provide or replace underground cables. The ability to limit input power draw can reduce cost of operation when connected to systems that have tiered pricing structures based on time of day that power is drawn from the electrical grid. The demand load placed on the grid does not necessarily increase when an EV is connected to the charging system and management systems provided in accordance with this disclosure can cause the charging system to limit the power drawn from the grid to off-peak times when lower-tier pricing applies.

Figure 1:
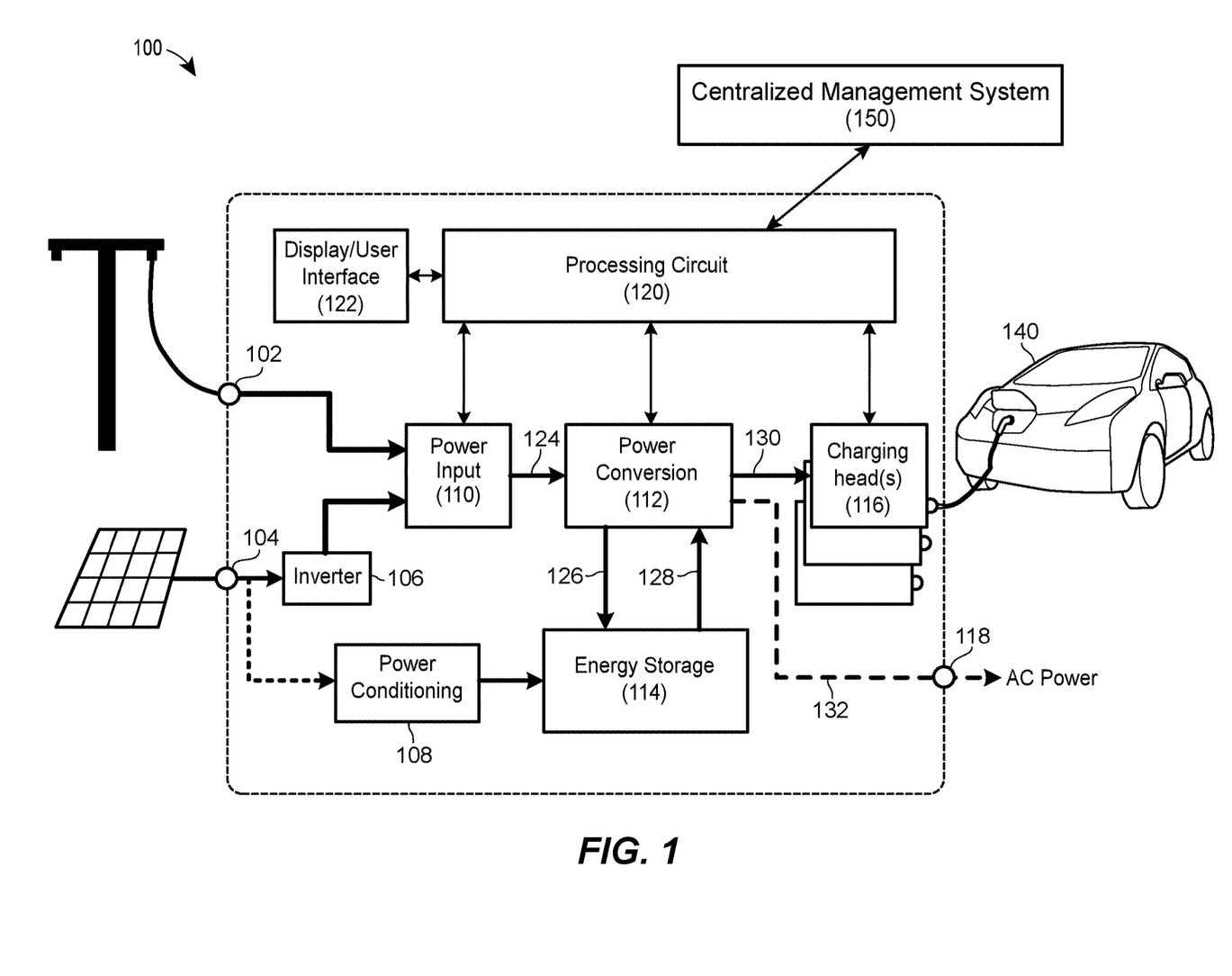
FIG. 1 illustrates an example of an electric vehicle charging system configured in accordance with certain aspects disclosed herein.

FIG. 1 illustrates an example of an EV charging system 100 configured in accordance with certain aspects disclosed herein. The illustrated EV charging system 100 may be provided in a residence, commercial property or publicly-accessible parking facility. The EV charging system 100 includes a power input module 110 that includes one or more circuits configurable to transform, condition or otherwise modify alternating current (AC) power received from an input port 102, 104 to provide conditioned power 124 to a power conversion module 112. The power conversion module 112 includes an AC-to-DC conversion circuit that generates a DC charging current 126 that is provided to an energy storage module 114. In one example, the energy storage module 114 includes high-capacity batteries that have a storage capacity greater than a multiple of the storage capacity in the EVs to be charged (e.g., three times, five times, or ten times a specific or average EV battery capacity).

In one aspect, an EV charging system 100 includes one or more input ports 104 configured for receiving an input of DC electric power such as may be provided by photovoltaic panels or other types of DC power sources, including external battery systems. EV charging system 100 includes an inverter module 106 and a power conditioning module 108. In one example, DC current received via an input port 104 may be converted to an AC current by an inverter module 106 and the AC current may be provided to power input module 110. In some implementations, the power input module 110 may combine AC current received from multiple sources. In some implementations, the power input module 110 may direct AC current received from multiple sources to individual circuits or sections of the power conversion module 112. In another example, DC current received via an input port 104 may be provided to a power conditioning module 108 that may include voltage level converting circuits, filters and other conditioning circuits to provide a charging current to the energy storage module 114.

In a residential implementation where N EVs are expected to receive a daily charge of P kW on a regular basis, the energy storage module 114 may have a storage capacity of at least (N+1)×P kW in order to accommodate the expected daily demand. In some instances, P may be set to the maximum charge capacity of each of the EVs. In other instances, the storage capacity of the energy storage module 114 may be configured based on expected usage of the EVs and resultant daily depletion in charge.

In an EV charging system 100 provided for commercial or public use, the storage capacity of the energy storage module 114 may be configured based on the maximum number of expected charging events in a day. The maximum number of expected charging events in a day may be calculated based on times of day in which the EV charging system 100 is made accessible. The storage capacity of the energy storage module 114 may further be configured based on the expected average charge per charging event, which may depend upon factors such as the types of EVs charged, the depletion level of the EV batteries when charging starts, and the duration of each charging event. For example, a retail parking site may have more charging events of shorter duration, while a commuter train parking lot may have fewer charging events of longer duration.

In various examples, the storage capacity of the energy storage module 114 may be configured based on maximum expected charging offset by power received from an electric utility. In some of these examples, the power received from an electric utility may be limited to power available during low-demand times, such as off-peak or low-priced periods of the day. The power input module 110 may be configured to block or disconnect inflows of power during peak or high-priced periods of the day. In some instances, the power input module 110 may be configured to enable power reception during peak periods to ensure continued operation of the EV charging system 100 when power levels in the energy storage module 114 are unexpectedly low.

According to certain aspects of this disclosure, the power conversion module 112 may include one or more DC-to-DC conversion circuits that receive DC current 128 at a first voltage level from the energy storage module 114 and drive a charging current 130 to an EV 140 through a charging head 116. The EV charging system 100 may be coupled to multiple charging heads 116 and the power conversion module 112 may include a corresponding number of DC-to-DC conversion circuits. In some instances, the charging head 116 may include power control circuits that further modify or control the voltage level of the charging current 130 passed through to the EV 140.

In some examples, the power conversion module 112 includes one or more inverters that convert the DC current 128 to an AC current 132 that can be provided at an AC output 118 of the EV charging system 100. The AC output 118 may be used to power one or more external charging heads or may be provided as backup power source for more general use. For example, the AC output 118 may comprise an outlet into which AC devices may be plugged or a direct connection to one or more devices or circuits in order to provide backup power at the site of the EV charging system 100.

According to certain aspects of this disclosure, a processing circuit 120 may be configured to control operations of the power conversion module 112. The processing circuit may monitor and control power levels received by the power input module 110, power levels output through the charging current 130 and/or the AC current 132 and energy levels in the energy storage module 114. The processing circuit may monitor temperatures within the EV charging system 100 and/or within different components of the EV charging system 100 and may be configured to mitigate increases in temperature through active cooling or power reductions.

The processing circuit 120 may be configured to communicate with the components of the EV charging system 100, including power conversion, inverter and power conditioning circuits over one or more data communication links. The processing circuit 120 may be configured to communicate with controllers or sensors coupled to the energy storage module 114, the charging head 116 and external devices, including an EV being charged. The processing circuit 120 may manage, implement or support one or more data communication protocols used to control communication over the various communication links. The data communication protocols may be defined by industry standards bodies or may be proprietary protocols.

In some examples, the power conversion module 112 includes some combination of AC-to-DC, DC-to-DC and/or DC-to-AC converters that enables efficient conversion of AC input power received from a power utility to a DC charging current 126 provided to the energy storage module 114 and from the energy storage module 114 to EV 140. In one example an inverter may be configured to achieve greater efficiency and cost effectiveness while enabling at least 150 kW charging levels, in contrast to the 120 kW levels provided by other systems. In some instances, the EV charging system 100 can provide an output current at or above 1000 volts that can match higher battery voltages used in some EVs 140. The higher voltage levels can enable faster, more efficient charging.

The processing circuit may include a user interface module 122 that can receive tactile or spoken input and can display information related to the operation of the EV charging system 100. The user interface module 122 may include or be coupled to a display with capabilities that reflect intended use of the EV charging system 100. In one example, a large nineteen-inch touchscreen may be provided to present details of charging status and user instructions, including instructions describing the method of connecting an EV 140. In another example, a small (four to six inch) LCD panel and display may be provided by the EV charging system 100. The user interface module 122 may include or be coupled to a touchscreen that interacts with the processing circuit 120 to provide additional information or advertising. The processing circuit 120 may include or be coupled to a wireless communication interface that can be used to deliver a wide variety of content to users of the EV charging system 100, including advertisements, news, point-of-sale content for products/services that can be purchased through the user interface module 122. The display system may be customized to match commercial branding of the operator, to accommodate language options and for other purposes.

Through the user interface module 122, the processing circuit 120 may provide information to enable the user to start charging, to confirm the start of charging, and to track the status of charging and so on. The user interface module 122 may support various input devices, including identity cards, touchless credit cards and other devices that interact through near-field communication protocols. The user interface module 122 may support user authentication protocols and may include or be coupled to biometric input devices such as fingerprint scanners, iris scanners, facial recognition systems and the like.

In one aspect of this disclosure, the energy storage module 114 is provisioned with a large battery pack and the processing circuit 120 is controlled by software that is configured to manage input received from an electrical power grid to the battery pack such that power is drawn from the grid to charge the battery pack at low-cost time periods and to avoid drawing power from the grid during peak-cost hours. The software may be further configured to manage power output to provide full, fast charging power in accordance with usage generated by monitoring patterns of usage by the EV charging system 100. The use of historical information can avoid situations in which the battery pack becomes fully discharged or depleted beyond a minimum energy threshold. For example, charging may be limited at a first time based upon a predicted later demand at a second time, which later demand may be predicted using historical information. This may spread limited charging capacity more evenly among vehicle throughout the course of a day or in other situations in which battery pack capacity is expected to be insufficient to fully charge all EVs over a time interval, taking account of the ability to add charge to the energy storage module 114.

In some examples, the energy storage module 114 includes air cooling for the battery pack and/or liquid cooling for the space surrounding the battery pack. Thermal blankets may be used for warming batteries in cold conditions and metal plates can be added to act as buffers and/or as additional heat sinks for cooling.

In one example, an energy storage module 114 provisioned with a battery pack that can deliver 160 kWh can charge a series of EVs 140 without significant delays between EVs 140 and without the energy storage module 114 falling below 50% capacity. The battery pack may be fully recharged during the lowest-cost periods of the day when local grid demand is lowest, which may correspond to late night or early morning hours. The EV charging system 100 may draw power from the electric grid at normal residential levels (e.g., <30 kW) and may be used at virtually all existing premises without utility upgrades, construction costs and associated delays in approvals, permits, construction projects for such upgrades.

In certain examples, one or more EV charging systems 100 may be prefabricated and preconfigured and can be installed within a few hours of delivery. Each EV charging system 100 occupies a small footprint and can be connected directly to an existing utility service access point provided on the premises. Installation of these EV charging systems 100 may be accomplished after providing conduit as needed from electrical service access points, and bolting the EV charging systems 100 to the ground or to a wall. The EV charging systems 100 can charge EVs 140 within hours of installation. In one example, an EV charging system 100 is enclosed in single metal housing that integrates batteries, inverters, power conversion circuits, wiring harnesses and control systems including the processing circuit 120 and other components of a battery management system (BMS).

An EV charging system 100 provided in accordance with certain aspects of this disclosure may be configured with two or more two charging ports to enable concurrent charging of multiple EVs 140. The processing circuit 120 may be configured by a user to support multiple modes of operation and may define procedures for power distribution that preserve energy levels in the energy storage module 114 when multiple EVs 140 are being concurrently charged. Distribution of power may be configured to enable fast charging of one or more EVs 140 at the expense of other EVs 140. In this regard, the charging ports may be prioritized or the processing circuit 120 may be capable of identifying and prioritizing connected EVs 140. In some instances, a user may identify priorities dynamically through the user interface module 122. For example, the processing circuit 120 may be configured to continue charging a first EV 140 at a maximum 120 kW when a second EV 140 is connected to a charging port, and may refrain from charging the second EV 140 until the charging rate for the first EV 140 drops below 60 kW. Reductions in charging rate may be configured to prevent thermal issues as the EV 140 approaches full charge. In this example, a 120 kW available power level may be split according to priorities.

In other examples, the processing circuit 120 may be configured to automatically split available power between two EVs 140 after the second EV 140 is connected. The available power may be evenly split between two EVs 140 or may be split according to priorities or capabilities. In some examples, the processing circuit 120 may conduct arbitration or negotiation between connected EVs to determine a split of charging capacity. An EV 140 may request a charging power level at any given moment based on temperature, battery charge level, and other characteristics of the EV 140 and its environment and to achieve maximum charge rate and minimum charging time for the current circumstances.

In accordance with certain aspects of this disclosure, a centralized management system 150 may communicate with multiple EV charging systems 100, including EV charging systems 100 that are deployed in locations separated by large geographic distances. Such centralized management system 150 may comprise one or more servers configured to receive operating data from and to send data and/or control commands to each of the EV charging systems 100. To facilitate communication, the centralized management system 150 may be communicatively connected to the processing circuit 120 of each EV charging system 100 via one or more electronic communication links, such as wired or wireless data connections, which may include portions of one or more digital communication networks. For example, the centralized management system 150 may communicate with EV charging systems 100 located in different parking facilities, on different floors of the same parking structure, or in different cities.

The centralized management system 150 may group or relate charging systems 100 according to their location, their intended function, availability, operating status and capabilities. The centralized management system 150 may remotely configure and control the EV charging systems 100. The centralized management system 150 may remotely enforce governmental regulations governing the operation of the EV charging systems 100. The centralized management system 150 may remotely interact with users of the EV charging systems 100. The centralized management system 150 may remotely manage billing, maintenance and error detection for each of the EV charging systems 100. The centralized management system 150 may communicate with mobile communication devices of users of the EV charging systems 100. The centralized management system 150 may communicate with mobile communication devices or other computing devices used by operators of the EV charging systems 100 to enable the operator to self-configure the EV charging systems 100, charge pricing, language localization, currency localization, and so on.

Figure 2:
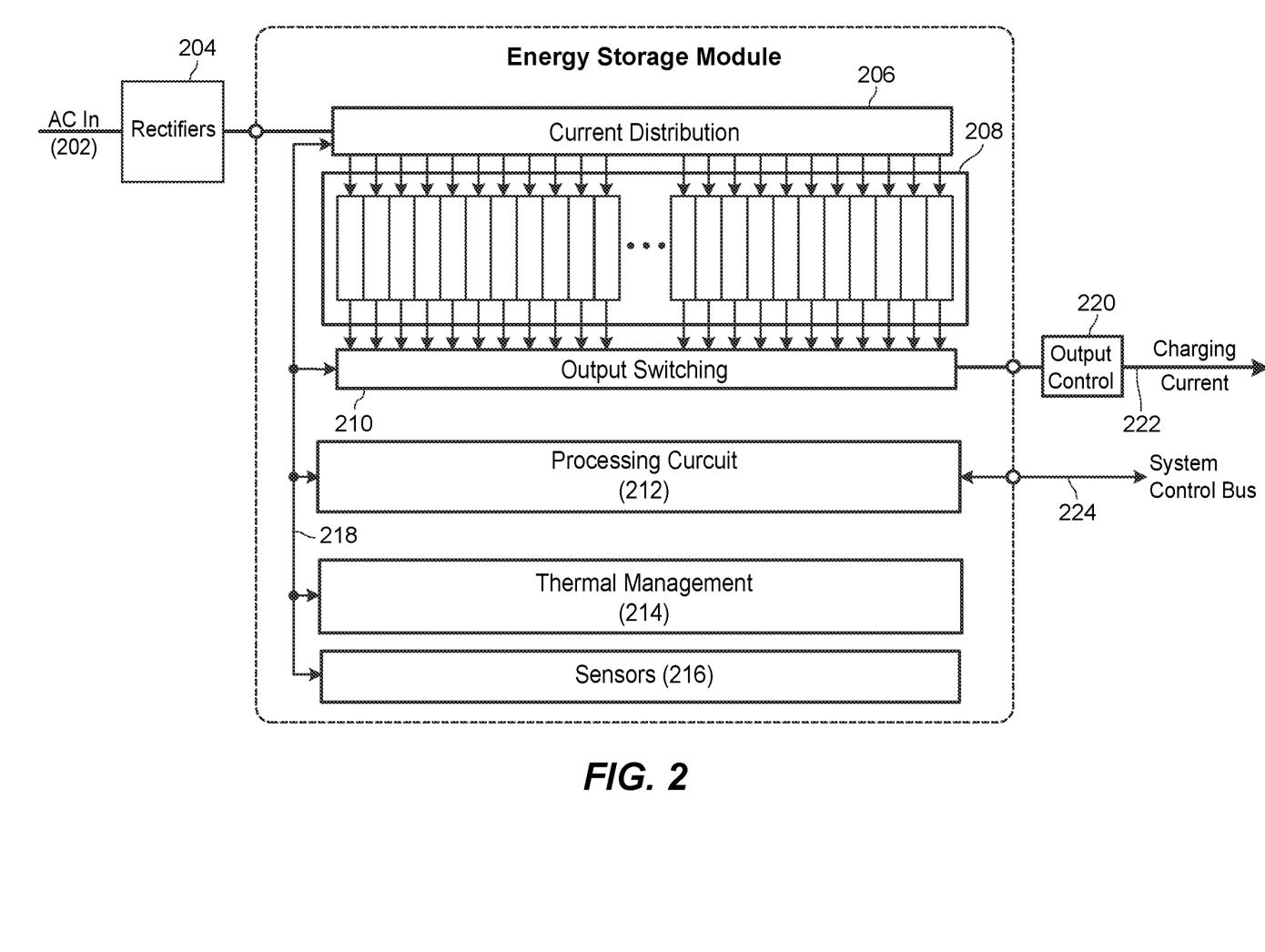
FIG. 2 illustrates an example of an energy storage module configured in accordance with certain aspects of this disclosure.

FIG. 2 illustrates an example of an energy storage module 200 configured in accordance with certain aspects of this disclosure. The energy storage module 200 may correspond to the energy storage module 114 illustrated in FIG. 1, for example. The energy storage module 200 may receive DC power derived from an AC input 202. The AC input 202 may be converted to DC by one or more power conversion circuits. Power conversion circuits may include one or more circuits configurable to transform, condition or otherwise modify the AC input 202 to provide a conditioned DC power output. For example, a generalized power conversion module includes an AC-to-DC conversion circuit that generates a DC charging current. In the illustrated example, the power conversion circuits are represented as a block of rectifiers 204. Multiple power conversion circuits may be provided, with each power conversion circuit being individually controlled to provide a charging current to one or more batteries in a battery pack 208. The power conversion circuits may be controlled or configured to optimize the charging process for each battery or group of batteries in the charging battery pack 208.

The battery pack 208 may be configurable to select groups of batteries to provide charging currents to corresponding EVs during EV charging operations. Each group of batteries may be associated with a conversion circuit. In some instances, a best available conversion circuit may be dynamically selected to charge a group of batteries. Dynamic selection may match available conversion circuits to groups of batteries based on current demand by the group of batteries, current delivery capabilities of the conversion circuits, temperature and other operating conditions of the conversion circuits, and/or for other reasons. A current distribution module 206 may include switching circuits that can couple the outputs of group of batteries to designated conversion circuits.

The outputs of the batteries in the battery pack 208 may be provided to an output switching circuit 210 that is configured to couple one or more batteries or groups of batteries to provide a charging current 222. The number of batteries or groups of batteries used to provide the charging current 222 may be selected based on capacity of the batteries, current output levels of the batteries and current levels requested by the EV that is being charged. An output control circuit 220 may be provided to deliver output power at a consistent voltage and wattage. The output control circuit 220 may include DC-to-DC converters such as buck and boost circuits that change voltage level of the battery output, filters to remove transients and sensors that can be used to increase or decrease the number of batteries used to produce the charging current 222.

The current distribution module 206, output switching circuit 210, the output control circuit 220 and a thermal management module 214 may respond to commands and control signals provided by a processing circuit 212 that is configured to manage operation of the energy storage module 200. To effect such control and to receive operating data regarding the energy storage module 200, the processing circuit 212 may be communicatively connected to the current distribution module 206, the output switching circuit 210, the thermal management module 214, and sensors 216 by an internal bus 218. The processing circuit 212 may cooperate with external processors to determine and activate configurations of batteries to use for charging an EV, and the processing circuit 212 may be communicatively connected to such external processors via a system control bus 224. In one example, the processing circuit 212 is configured as a finite state machine. In some examples, the processing circuit 212 includes a programmable logic controller (PLC), microcontroller, microprocessor or other type of processor.

The processing circuit 212 may be configured to limit input current flow based on the capacity of a provisioned utility service that provides the AC input 202. In one example, the processing circuit 212 may limit input current to remain with a 30 kW ceiling for a circuit provided by a power utility company. The processing circuit 212 may be further configured to manage power flows when, for example, an EV is drawing 120 kW or more and while the AC input 202 is supplying 30 kW or less. Power flows may be managed by configuring groups of batteries used to provide a desired or requested charging current 222 and switching between groups of batteries when depletion is imminent or when the requested level of the charging current 222 changes.

The thermal management module 214 may include, control, configure or manage the operation of cooling and heating elements used to maintain temperatures within minimum and maximum limits defined for the batteries and associated circuits. The heating and cooling elements may include forced air components such as fans or impellers, a coolant supply that is circulated through channels, pipes or ducts within the energy storage module 200, compressors and other components of thermodynamic systems that provide a Carnot cycle, heat pumps, heat exchangers radiant heaters, induction heaters, burners and so on. Cooling may be activated due to environmental conditions or when heat generation by the components of the energy storage module 200 increase internal temperatures. Cooling may be activated due to environmental conditions when external temperatures drop to levels that preclude battery or ancillary circuit operation.

The thermal management module 214 may include or be connected to sensors 216. Certain sensors 216 may be configured to monitor operating conditions within and without the thermal management module 214. Certain sensors 216 may be configured to monitor current flows, battery capacity and/or stored energy levels. The output of the sensors 216 may be monitored by or through the processing circuit 212. In some instances, sensor data may be directly monitored by external processors. In some instances, certain sensors 216 may trigger an event or alarm that causes the processing circuit 212 to immediately terminate operations of the energy storage module 200. In one example, an emergency shutdown may be indicated by an overtemperature, over-current or over-voltage condition. In another example, an emergency shutdown may be executed in response to a command or signal received from an external source such as a facilities management system via a system control bus 224.

Figure 3:
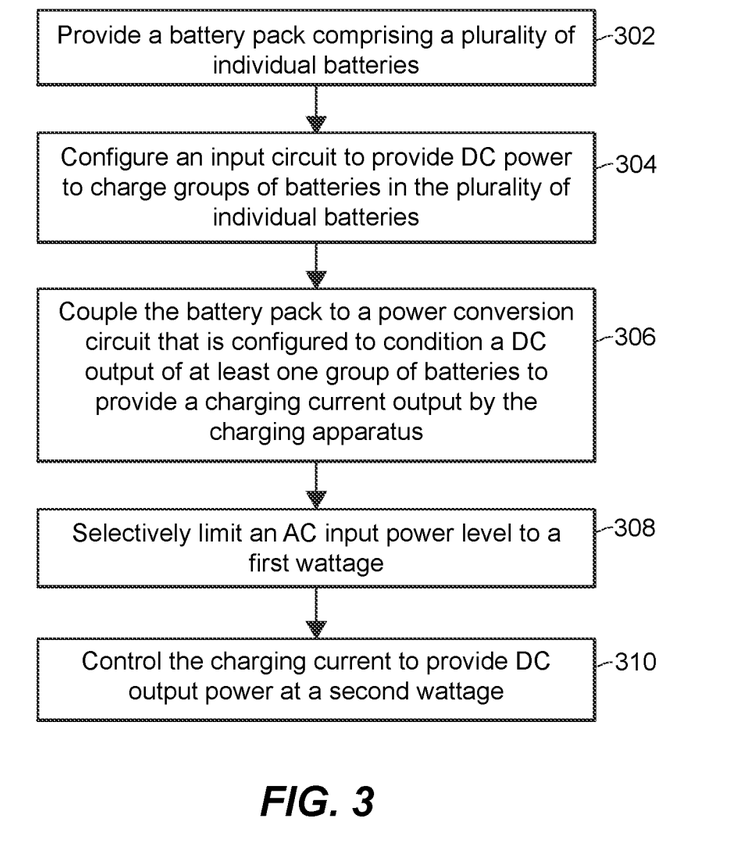
FIG. 3 is a flow chart illustrating a method for providing a charging apparatus.

FIG. 3 is a flow chart 300 of a method for providing a charging apparatus. At block 302, a battery pack comprising a plurality of individual batteries may be provided. Providing such battery pack may include placement of a battery pack (e.g., one or more batteries in a battery pack 208) within an energy storage module (e.g., the energy storage module 114) of a charging apparatus or charging station (e.g., an EV charging system 100). In some examples, a single battery comprising a plurality of separately accessible battery cells may be provided as the plurality of individual batteries, which battery may include an internal battery management system.

At block 304, an input circuit may be configured to provide DC power to charge groups of batteries in the plurality of individual batteries of the battery pack. The input circuit may include a current distribution module 206 to control coupling of DC current to the plurality of batteries. The input circuit may include an AC-to-DC conversion circuit configured to provide the DC power to charge the groups of batteries, such as the one or more rectifiers 204 or the power conversion module 112. The input circuit may include a DC-to-AC inverter (e.g., the inverter module 106) configured to provide the AC power to the AC-to-DC conversion circuit.

At block 306, the battery pack may be coupled to a power conversion circuit that is configured to condition a DC output of at least one group of batteries to provide a charging current output by the charging apparatus. The power conversion circuit may comprise the power conversion module 112 or a portion thereof configured to supply the driving current 130 to the one or more charging heads 116. Additionally or alternatively, the power conversion circuit may comprise the output switching circuit 210 and/or the output control circuit 220 in order to supply the charging current 222. In some examples, coupling the battery pack to the power conversion circuit and configuring the input circuit may be combined by coupling the battery pack to a power conversion module 112 configured to provide DC power to charge groups of batteries in the battery pack and also configured to condition DC output of one or more groups of batteries in the battery pack. Either or both the input circuit and the power conversion circuit may be configured to be controlled by one or more processing circuits 120 or 212.

At block 308, an AC input power level may be limited to a first wattage. The AC input power level may be limited to a predetermined first wattage and/or to a variable first wattage. The predetermined first wattage may be set to a fixed maximum limit for AC input power prior to operation of the charging apparatus. In some examples, the predetermined first wattage may be set to a level a residential power supply can safely accommodate or to a maximum level a local power supply can efficiently provide. The variable first wattage may be determined or set by one or more processing circuits 120 or 212, or the variable first wattage may be received at various times from a centralized management system 150. In some examples, the variable first wattage may be set based upon one or more availability metrics relating to a local AC power supply at a time or during a time interval, such as total actual or predicted load on a local power grid, actual or predicted local AC power supply, or price levels for local AC power. Limiting the AC input power level to a first wattage may be inherent or selective. Inherent limiting of the AC input power level may comprise fixed limits imposed by the configuration of the input circuit in order to ensure the maximum power consumed by the battery pack does not exceed a fixed threshold level. Selectively controlling the AC input power level may include controlling the level of power consumed by the battery pack in order to ensure the power consumed does not exceed a variable threshold level using one or more processing circuits 120 or 212 controlling the input circuit. In one example, the AC input power level may be limited by connecting or disconnecting various groups of one or more of the plurality of individual batteries of the battery pack in order to control the total load of the battery pack while charging. This may further include disconnecting groups of the plurality of individual batteries while such groups are used to provide a charging current, thereby limiting the AC input power level to a first wattage less than a second wattage of the charging current. In some examples, one or more groups of the plurality of individual batteries may be selected for charging based upon measurements of current from one or more sensors (e.g., sensors 216) associated with the individual batteries.

At block 310, the charging current may be controlled to provide DC output power at a second wattage. In some examples, the second wattage is greater than the first wattage in order to provide faster charging of vehicle batteries while limiting input power levels. The second wattage may be controlled by one or more processing circuits 120 or 212 to provide the DC output power at a voltage and current suitable for charging an EV 140 via a charging head 116, which may include power control circuits that further modify or control the voltage level of the charging current based upon charging parameters of the EV 140.

In some examples, a power conditioning circuit (e.g., the power conditioning module 108) may be configured to receive a DC input current from an input port (e.g., DC input port 104) and to provide a conditioned DC input current to charge one or more batteries in the plurality of individual batteries (e.g., one or more batteries in a battery pack 208 of the energy storage module 114). Such power conditioning circuit may receive DC power from one or more external DC power sources, such as photovoltaic panels or other types of DC power sources. Receiving and conditioning a DC input current may further improve efficiency by slowly charging the one or more batteries using low-current or low-voltage power sources without the losses incurred by inverting and rectifying the DC input current through DC-to-AC and AC-to-DC conversion circuits. Charging using such DC input current may be particularly beneficial for remote locations or locations with unstable electric power supply from local power grids. In some examples, however, design considerations may favor or require the use of an inverter circuit (e.g., the inverter module 106) to convert such DC input current into an AC input current.

In some examples, the first wattage is no more than 30 kW and the second wattage is at least 120 kW. In various examples, the second wattage is at least 150 kW. In certain examples, the second wattage is at least 1000 kW. The first wattage may be configured based on available power draw defined for a residential user of an electrical grid operated by a power utility. The available power draw for a residential user may vary based upon the limitations of the residential utility customer's systems, which is typically below approximately 30 kW.

In one example, the at least one group of batteries (e.g., one or more batteries in a battery pack 208) is configured to provide a desired current level for the charging current. The power conversion circuit (e.g., the power conversion modules 112) may be configured to provide the DC output power at a desired voltage or current level. Additionally, one or more power control circuits associated with one or more respective charging heads (e.g., the charging heads 116) may further control delivery of the DC output power to an EV.

In certain examples, a temperature control element (e.g., the thermal management module 214) is used or operated to maintain an internal temperature of the charging apparatus below a maximum thermal operating limit defined for the battery pack. The temperature control element may include a fan, an impeller, a compressor, a coolant that is circulated through channels, pipes or ducts, a heat pump or a heat exchanger.

In one example, the charging apparatus is coupled to one or more electrical vehicles that are to receive a corresponding charging current.

Additional Descriptions Related to Processing Circuits

Figure 4:
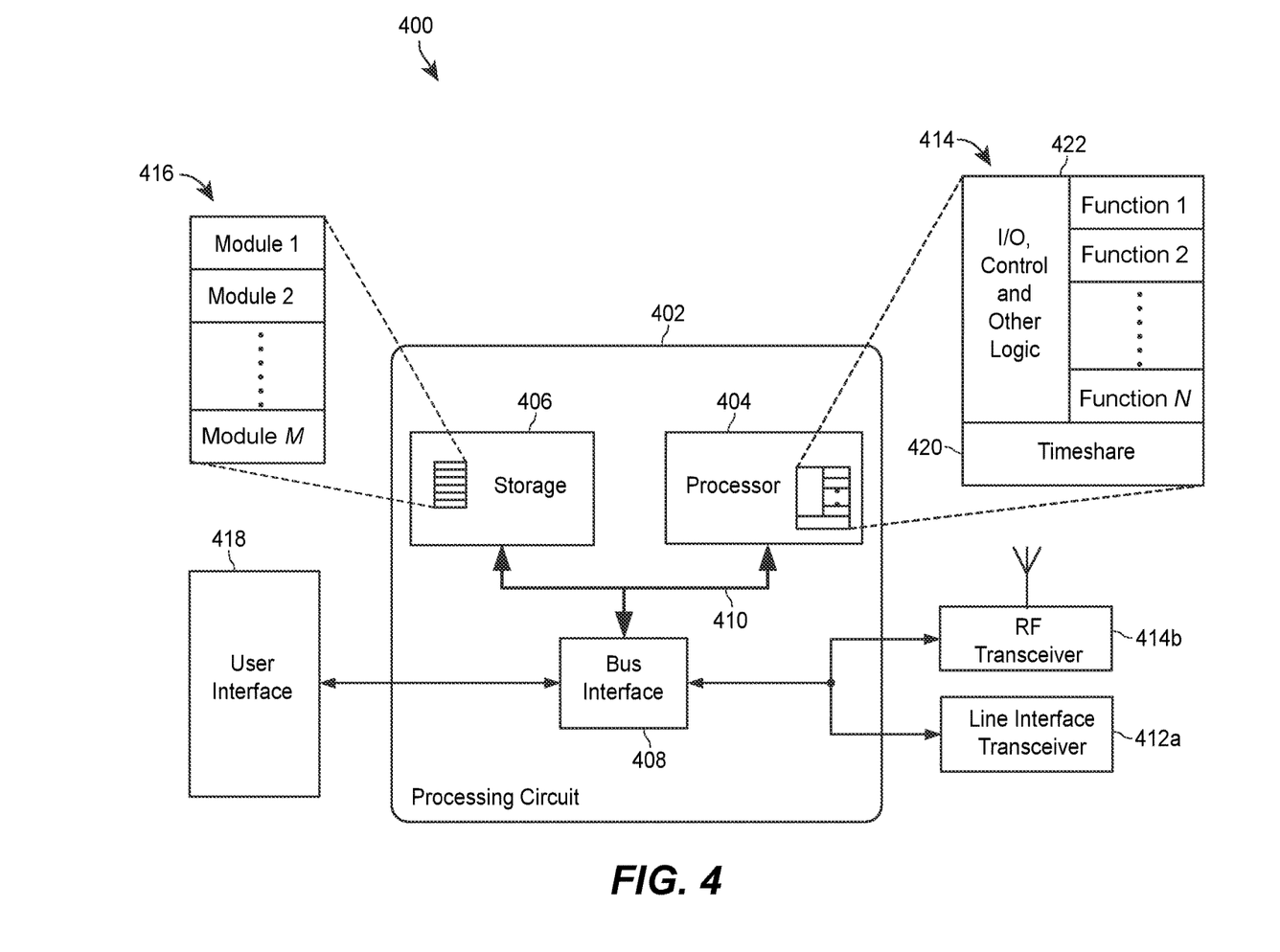
FIG. 4 is a diagram illustrating an example of a hardware implementation for an apparatus employing a processing circuit adapted according to certain aspects disclosed herein.

FIG. 4 is a conceptual diagram illustrating a simplified example of a hardware implementation for an apparatus 400 employing a processing circuit 402 that may be configured to perform one or more functions disclosed herein. In accordance with various aspects of the disclosure, an element, or any portion of an element, or any combination of elements as disclosed herein may be implemented using the processing circuit 402. The processing circuit 402 may include one or more processors 404 that are controlled by some combination of hardware and software modules. Examples of processors 404 include microprocessors, microcontrollers, digital signal processors (DSPs), application-specific integrated circuits (ASICs), field programmable gate arrays (FPGAs), programmable logic devices (PLDs), state machines, sequencers, gated logic, discrete hardware circuits, and other suitable hardware configured to perform the various functionality described throughout this disclosure. The one or more processors 404 may include specialized processors that perform specific functions, and that may be configured, augmented or controlled by one of the software modules 416. The one or more processors 404 may be configured through a combination of software modules 416 loaded during initialization, and further configured by loading or unloading one or more software modules 416 during operation.

In the illustrated example, the processing circuit 402 may be implemented with a bus architecture, represented generally by the bus 410. The bus 410 may include any number of interconnecting buses and bridges depending on the specific application of the processing circuit 402 and the overall design constraints. The bus 410 links together various circuits including the one or more processors 404 and storage 406. Storage 406 may include memory devices and mass storage devices, and may be referred to herein as computer-readable media and/or processor-readable media. The bus 410 may also link various other circuits such as timing sources, timers, peripherals, voltage regulators, and power management circuits. A bus interface 408 may provide an interface between the bus 410 and one or more line interface circuits 412, which may include a line interface transceiver circuit 412a and a radio frequency (RF) transceiver circuit 412b, as illustrated in FIG. 4. A line interface transceiver circuit 412a may be provided for each networking technology supported by the processing circuit. In some instances, multiple networking technologies may share some or all of the circuitry or processing modules found in a line interface circuit 412, such as line interface transceiver circuit 412a for wired communication and RF transceiver circuit 412b for wireless communication. Each line interface circuit 412 provides a means for communicating with various other apparatuses over a transmission medium. Depending upon the nature of the apparatus 400, a user interface 418 (e.g., keypad, display, speaker, microphone, joystick) may also be provided, and may be communicatively coupled to the bus 410 directly or through the bus interface 408.

A processor 404 may be responsible for managing the bus 410 and for general processing that may include the execution of software stored in a computer-readable medium that may include the storage 406. In this respect, the processing circuit 402, including the processor 404, may be used to implement any of the methods, functions and techniques disclosed herein. The storage 406 may be used for storing data that is manipulated by the processor 404 when executing software, and the software may be configured to implement any one of the methods disclosed herein.

One or more processors 404 in the processing circuit 402 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 406 or in an external computer readable medium. The external computer-readable medium and/or storage 406 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium and/or storage 406 may also include, by way of example, a carrier wave, a transmission line, and any other suitable medium for transmitting software and/or instructions that may be accessed and read by a computer. Computer-readable medium and/or the storage 406 may reside in the processing circuit 402, in the processor 404, external to the processing circuit 402, or be distributed across multiple entities including the processing circuit 402. The computer-readable medium and/or storage 406 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 406 may maintain software maintained and/or organized in loadable code segments, modules, applications, programs, etc., which may be referred to herein as software modules 416. Each of the software modules 416 may include instructions and data that, when installed or loaded on the processing circuit 402 and executed by the one or more processors 404, contribute to a run-time image 414 that controls the operation of the one or more processors 404. When executed, certain instructions may cause the processing circuit 402 to perform functions in accordance with certain methods, algorithms and processes described herein.

Some of the software modules 416 may be loaded during initialization of the processing circuit 402, and these software modules 416 may configure the processing circuit 402 to enable performance of the various functions disclosed herein. For example, some software modules 416 may configure internal devices and/or logic circuits 422 of the processor 404, and may manage access to external devices such as line interface circuits 412, the bus interface 408, the user interface 418, timers, mathematical coprocessors, and so on. The software modules 416 may include a control program and/or an operating system that interacts with interrupt handlers and device drivers, and that controls access to various resources provided by the processing circuit 402. The resources may include memory, processing time, access to the line interface circuits 412, the user interface 418, and so on.

One or more processors 404 of the processing circuit 402 may be multifunctional, whereby some of the software modules 416 are loaded and configured to perform different functions or different instances of the same function. The one or more processors 404 may additionally be adapted to manage background tasks initiated in response to inputs from the user interface 418, the line interface circuits 412, and device drivers, for example. To support the performance of multiple functions, the one or more processors 404 may be configured to provide a multitasking environment, whereby each of a plurality of functions is implemented as a set of tasks serviced by the one or more processors 404 as needed or desired. In one example, the multitasking environment may be implemented using a timesharing program 420 that passes control of a processor 404 between different tasks, whereby each task returns control of the one or more processors 404 to the timesharing program 420 upon completion of any outstanding operations and/or in response to an input such as an interrupt. When a task has control of the one or more processors 404, the processing circuit is effectively specialized for the purposes addressed by the function associated with the controlling task. The timesharing program 420 may include an operating system, a main loop that transfers control on a round-robin basis, a function that allocates control of the one or more processors 404 in accordance with a prioritization of the functions, and/or an interrupt driven main loop that responds to external events by providing control of the one or more processors 404 to a handling function.

In one example, the apparatus 400 operates as a charging device and includes a battery pack having a plurality of individual batteries, an input circuit configured to provide direct current (DC) power to charge groups of batteries in the plurality of individual batteries, and a power conversion circuit configured to condition a DC output of at least one group of batteries to provide a charging current output by the charging apparatus. The processing circuit 402 may be configured to limit an AC input power level to a first wattage and control the charging current to provide DC output power at a second wattage. The input circuit may include an AC-to-DC conversion circuit configured to provide the DC power to charge the groups of batteries. The input circuit may include an DC-to-AC inverter configured to provide the AC power to the power conversion circuit. In some examples, the apparatus 400 includes a power conditioning circuit configured to receive a DC input current from an input port and to provide a conditioned DC input current to charge one or more batteries in the plurality of individual batteries.

In one example, the first wattage is no more than 30 kW and the second wattage is at least 120 kW. The first wattage may be configured based on available power draw defined for a residential user of an electrical grid operated by a power utility. The available power draw for a residential user may vary based upon the limitations of the residential utility customer's systems, but is typically below approximately 30 kW.

In some examples, the processing circuit 402 may control the charging current by configuring the least one group of batteries (e.g., one or more batteries in a battery pack 208) to provide a desired current level for the charging current. In some examples, the processing circuit 402 may control the charging current by configuring the power conversion circuit (e.g., the power conversion module 112) to provide the DC output power at a desired voltage or current level. Additionally, one or more power control circuits associated with one or more respective charging heads (e.g., the charging heads 116) may further control delivery of the DC output power to an EV, which power control circuits may be part of or controlled by the processing circuit 402.

In some examples, a temperature control element (e.g., the thermal management module 214) is configured to maintain an internal temperature of the charging apparatus below a maximum thermal operating limit defined for the battery pack. The temperature control element may include a fan, an impeller, a compressor, a coolant that is circulated through channels, pipes or ducts, a heat pump, a heat exchanger, radiant heater, an induction heater or a burner.

In one example, the apparatus 400 provides a coupling (e.g., a charging head 116) configured to provide an electrical interconnect between the charging apparatus to an electrical vehicle that is to receive the charging current.

Exemplary Implementation of Vehicle Charging System

Figure 5:
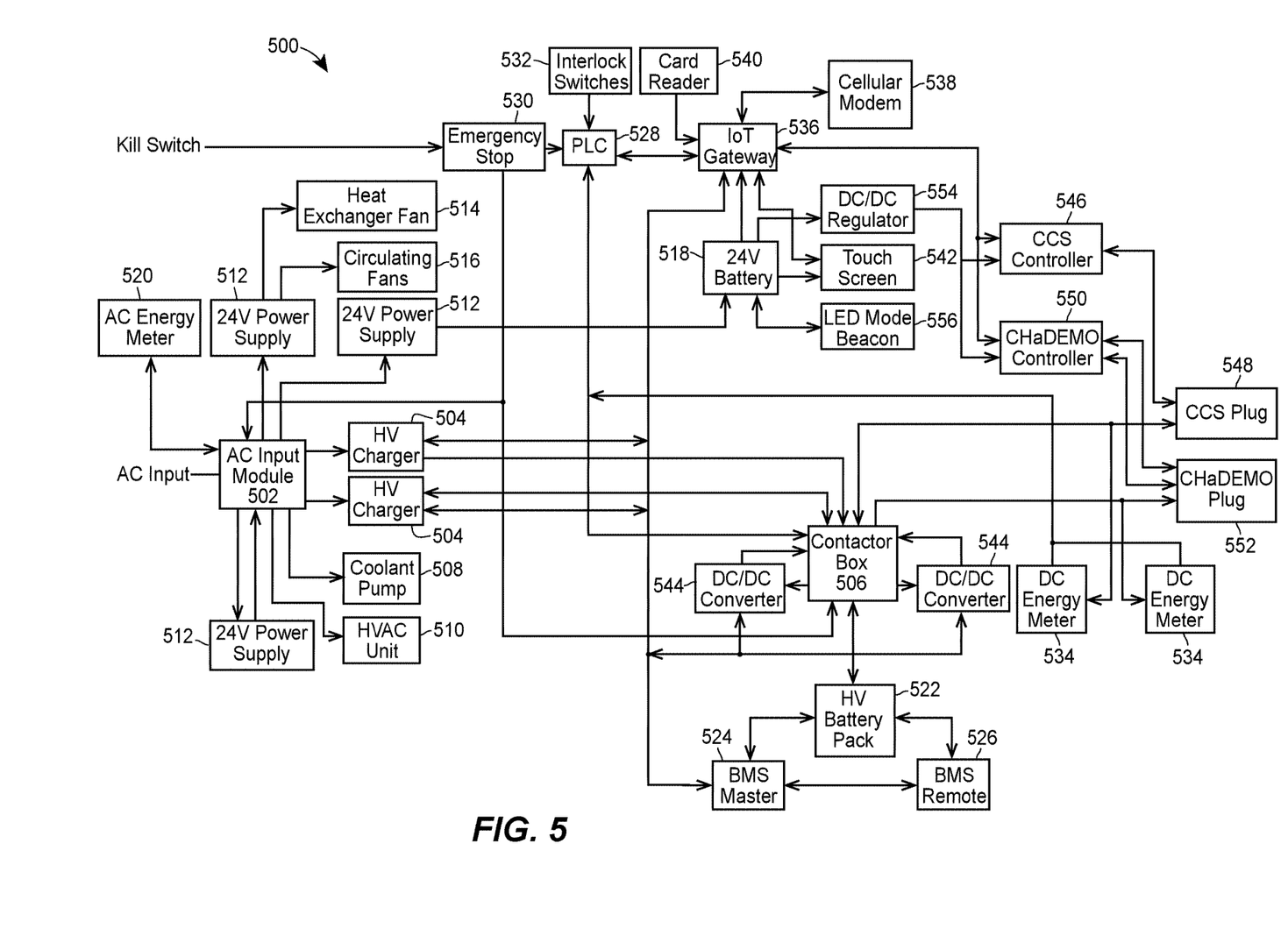
FIG. 5 shows a block schematic diagram of an example of vehicle charging system configured in accordance with certain aspects of this disclosure.

FIG. 5 shows a block schematic diagram of certain components in an example vehicle charging system 500, such as an EV charging system 100. The vehicle charging system 500 receives power at an AC input module 502 from an AC input power source, such as a 120V or 240V single-phase or three-phase electric power grid connection. The AC input module 502 provides the received AC current to a plurality of high-voltage (HV) chargers 504, which convert the AC current to a high-voltage DC current that is then provided to a contactor box 506 for further storage and use in vehicle charging. In addition to providing the received AC current to the HV chargers 504, the AC input module 502 provides power to a plurality of thermal management components, either directly or indirectly. In the illustrated example, the AC input module 502 provides 120V AC current directly to coolant pump 508 and HVAC unit 510. The AC input module 502 provides indirect power to additional components through 24V power supplies 512, which convert the 120V AC current from the AC input module 502 into 24V DC current. The 24V power supplies 512 provide DC current to thermal management components such as a heat exchanger fan 514 and one or more circulating fans 516, as well as to a 24V battery 518. In some examples, the AC input module 502 may include one or more converter circuits to transform, condition or otherwise modify AC input current to provide conditioned AC power to the various components. The AC input module 502 is also connected to an AC energy meter 520 that monitors AC power consumption by the vehicle charging system 500. In some examples, the AC energy meter 520 may further monitor energy consumption at a site where the vehicle charging system 500 is located. The AC energy meter 520 may provide energy usage data to one or more local or remote processing circuits via wired or wireless communication channels (not shown) to facilitate control of charging the HV battery pack 522.

The HV battery pack 522 receives DC power from the contactor box 506, stores the received energy in one or more individual batteries, and provides DC power to the contactor box 506 in order to charge vehicles. The HV battery pack 522 is controlled by a battery management system (BMS), which may include a BMS master controller 524 that provides primary control and a BMS remote controller 526 that provides remote monitoring and analysis of the HV battery pack 522. The contactor box 506 provides power to and receives power from the HV battery pack 522 based upon control commands from a programmable logic controller (PLC) 528 via an I/O connection. The PLC 528 may comprise one or more processors implementing control logic to receive input signals and provide output signals, including control signals to the contactor box 506. The PLC 528 may communicate such signals over one or more communication connections, such as an I/O circuit or a system bus. The PLC 528 receives input signals or data from the contactor box 506, an emergency stop 530 configured to rapidly shut-off charging in response to actuation of a kill switch, one or more interlock switches 532 configured to indicate physical connections of various components within the vehicle charging system 500 (e.g., to shut-off charging when an access panel of the system is opened for maintenance), DC energy meters 534 configured to measure DC energy provided via the charging heads, and an Internet of Things (IoT) Gateway 536. The PLC 528 receives data signals from and provides data signals to each of the contactor box 506 and the IoT gateway 536 in order to monitor relevant conditions and control operation of the vehicle charging system 500.

The IoT gateway 536 serves as a central hub for communication between the PLC 528 and various components of the vehicle charging system 500, as well as for communication with external components via a cellular modem 538 or other electronic communication components. The cellular modem 538 facilitates electronic communication with remote data sources and/or remote control sources, such as a centralized management system 150. Some such data sources may include IoT devices installed within or external to the vehicle charging system 500. In some embodiments, the PLC 528 receives or generates operating data regarding the vehicle charging system 500 and causes the cellular modem 538 to transmit such operating data to remote servers via the IoT gateway 536. The IoT gateway 536 also communicates with local user interface components, such as a card reader 540 and a touch screen 542, to enable a user to operate the vehicle charging system 500. A user may also operate the vehicle charging system 500 via signals sent from a user computing device (e.g., a smartphone or an onboard computing system of a vehicle) to the cellular modem 538 (e.g., via an Internet connection). The IoT gateway 536 may be configured to communicate with components of the system via a local bus in order to receive operating data from and/or to send control signals to the HV chargers 504, the BMS master controller 524, and one or more DC/DC converters 544 configured to convert between a battery voltage level of the HV battery pack 522 and a charging voltage level used to charge a vehicle.

Additionally, the IoT gateway 536 communicates with one or more charging head controllers, each associated with a vehicle charging plug. In the illustrated example, the IoT gateway 536 communicates with a combined charging system (CCS) controller 546 connected to a CCS plug 548 and also communicates with a CHaDEMO controller 550 connected to a CHaDEMO plug 552. Each of the charging head controllers (i.e., the CCS controller 546 and the CHaDEMO controller 550) is powered by the 24V battery 518 through a DC/DC regulator 554 in order to control the supply of charging current to a vehicle through the respective vehicle charging plug. Each of the CCS plug 548 and the CHaDEMO plug 552 is also connected to the contactor box 506 to receive the charging current. To supply the charging current, the contactor box 506 is controlled by the PLC 528 to actuate switches to connect groups of batteries from the HV battery pack 522 to one or more DC/DC converters 544, which may include power conversion circuits such as buck and boost circuits that change voltage level of the battery output and other components to filter or otherwise condition the output charging current for charging a vehicle. In some examples, a first DC/DC converter 544 is configured to provide charging current suitable for the CCS plug 548, while a second DC/DC converter is configured to provide charging current suitable for the CHaDEMO plug 552.

The 24V battery 518 provides power to the DC/DC regulator 554, the IoT gateway 536, the touch screen 542, and an LED mode beacon 556 to ensure temporary continued operation for a short duration in the event of loss of power from the AC input. Likewise, the 24V battery 518 may provide power to the PLC 528 either directly or through the IoT gateway 536. The LED mode beacon may present visual indications of the current operating status of the vehicle charging system 500 via one or more LED lighting elements in order to signal availability, unavailability, charge level, or other relevant information to users or potential users of the system.

Other Considerations

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It should also be understood that, unless a term is expressly defined in this patent using the sentence "As used herein, the term '______' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this disclosure is referred to in this disclosure in a manner consistent with a single meaning, that is done for the sake of clarity only so as to not confuse the reader, and it is not intended that such claim term be limited, by implication or otherwise, to that single meaning.

What is claimed is:

1. A charging apparatus for charging a vehicle, comprising:
   a battery pack comprising a plurality of individual batteries;
   a power input port configured to receive input electrical power from a power source, wherein the input electrical power is received at a first wattage;
   a power input circuit configured to provide direct current (DC) power to charge groups of batteries selected from the plurality of individual batteries using power received at the power input port;
   a power conversion circuit configured to provide a charging current as a DC output of each of a plurality of selectable groups of batteries of the battery pack, each such group including multiple batteries of the plurality of batteries;
   a coupling configured to receive the charging current and provide an electrical interconnect between the charging apparatus and the vehicle in order to provide the charging current to the vehicle; and
   a processing circuit configured to dynamically select and control the power conversion circuit to provide the charging current at a second wattage greater than the first wattage during a time interval and further configured to control the power input circuit to prevent charging at least one group of batteries while simultaneously charging at least one additional group of batteries of the battery pack during the time interval.

2. The charging apparatus of claim 1, wherein:
   the input electrical power comprises alternating current (AC) input power from an AC power source; and
   the processing circuit is further configured to limit an input power level of the AC input power to the first wattage.

3. The charging apparatus of claim 2, wherein the processing circuit is configured to selectively limit the input power level of the AC input power to a first value of the first wattage at a first time and to a second value of the first wattage at a second time based upon total demand levels for the AC power source at each of the first and second times.

4. The charging apparatus of claim 3, wherein:
   the second value of the first wattage is zero kilowatts; and
   the processing circuit is configured to control the power input circuit to disconnect the battery pack from the input electrical power at the second time.

5. The charging apparatus of claim 1, wherein:
   the input electrical power comprises alternating current (AC) input power from an AC power source; and
   the power input circuit comprises an AC-to-DC conversion circuit configured to provide the DC power to charge the groups of batteries by converting the AC input power to the DC power.

6. The charging apparatus of claim 1, wherein the first wattage is no more than 30 kilowatts and the second wattage is at least 120 kilowatts.

7. The charging apparatus of claim 1, wherein:
   the input electrical power comprises DC input power from a DC power source;
   the charging apparatus further comprises an inverter circuit configured to convert the DC input power to alternating current (AC) power; and
   the power input circuit comprises an AC-to-DC conversion circuit configured to provide the DC power to charge the groups of batteries by converting the AC power to the DC power.

8. The charging apparatus of claim 1, wherein:
   the input electrical power comprises DC input power from a DC power source; and
   the charging apparatus further comprises a power conditioning circuit configured to receive the DC input power from the power input port and to provide a conditioned DC input current to the power input circuit in order to charge the groups of batteries in the plurality of individual batteries.

9. The charging apparatus of claim 1, wherein the processing circuit is configured to control the charging current by configuring the at least one group of batteries to provide a desired current level for the charging current.

10. The charging apparatus of claim 1, wherein the processing circuit is configured to control the charging current by controlling the power conversion circuit to provide the charging current at a desired voltage level.

11. The charging apparatus of claim 1, wherein the power conversion circuit is configured to condition the DC output of the at least one group of batteries to provide the charging current.

12. The charging apparatus of claim 1, further comprising:
a temperature control element configured to maintain an internal temperature of the charging apparatus below a maximum thermal operating limit defined for the battery pack.

13. A method for providing a charging apparatus for charging vehicles, comprising:
providing a battery pack comprising a plurality of individual batteries;
configuring a power input port to receive input electrical power from a power source, wherein the input electrical power is received at a first wattage;
configuring a power input circuit to provide direct current (DC) power to charge groups of batteries selected from the plurality of individual batteries using power received at the power input port;
coupling the battery pack to a power conversion circuit configured to configured to provide a charging current as a DC output of each of a plurality of selectable groups of batteries of the battery pack, each such group including multiple batteries of the plurality of batteries;
connecting the power conversion circuit to the vehicle to provide the charging current to the vehicle via a coupling configured to receive the charging current and to provide an electrical interconnect between the charging apparatus and the vehicle; and
configuring processing circuit of the charging apparatus to dynamically select and control the power conversion circuit to provide the charging current at a second wattage greater than the first wattage during a time interval and to control the power input circuit to prevent charging at least one group of batteries while simultaneously charging at least one additional group of batteries of the battery pack during the time interval.

14. The method of claim 13, wherein the input electrical power comprises alternating current (AC) input power from an AC power source, and further comprising:
configuring processing circuit of the charging apparatus to control the power input circuit to limit an input power level of the AC input power to the first wattage.

15. The method of claim 14, wherein the processing circuit is configured to selectively limit the input power level of the AC input power to a first value of the first wattage at a first time and to a second value of the first wattage at a second time based upon total demand levels for the AC power source at each of the first and second times.

16. The method of claim 15, wherein:
the second value of the first wattage is zero kilowatts; and
the processing circuit is configured to control the power input circuit to disconnect the battery pack from the input electrical power at the second time.

17. The method of claim 13, wherein:
the input electrical power comprises alternating current (AC) input power from an AC power source; and
the power input circuit comprises an AC-to-DC conversion circuit configured to provide the DC power to charge the groups of batteries by converting the AC input power to the DC power.

18. The method of claim 13, wherein the first wattage is no more than 30 kilowatts and the second wattage is at least 120 kilowatts.

19. The method of claim 13, wherein the input electrical power comprises DC input power from a DC power source, and further comprising:
configuring an inverter circuit to convert the DC input power to alternating current (AC) power and provide the AC power to the power input circuit,
wherein the power input circuit comprises an AC-to-DC conversion circuit configured to provide the DC power to charge the groups of batteries by converting the AC power to the DC power.

20. The method of claim 13, wherein the input electrical power comprises DC input power from a DC power source, and further comprising:
configuring a power conditioning circuit to receive the DC input power from the power input port and to provide a conditioned DC input current to the power input circuit in order to charge the groups of batteries in the plurality of individual batteries.

21. The method of claim 13, wherein the processing circuit is configured to control the power conversion circuit to provide the charging current by configuring the at least one group of batteries to provide a desired current level for the charging current.

22. The method of claim 13, wherein the processing circuit is configured to control the power conversion circuit to provide the charging current by controlling the power conversion circuit to provide the charging current at a desired voltage level.

23. The method of claim 13, wherein the power conversion circuit is configured to condition the DC output of the at least one group of batteries to provide the charging current.

24. The method of claim 13, further comprising:
configuring a temperature control element within the charging apparatus to maintain an internal temperature of the charging apparatus below a maximum thermal operating limit defined for the battery pack.

* * * * *